March 14, 1950      P. SHEARER      2,500,434
LAWN TRIMMER
Filed Jan. 19, 1945      2 Sheets-Sheet 1
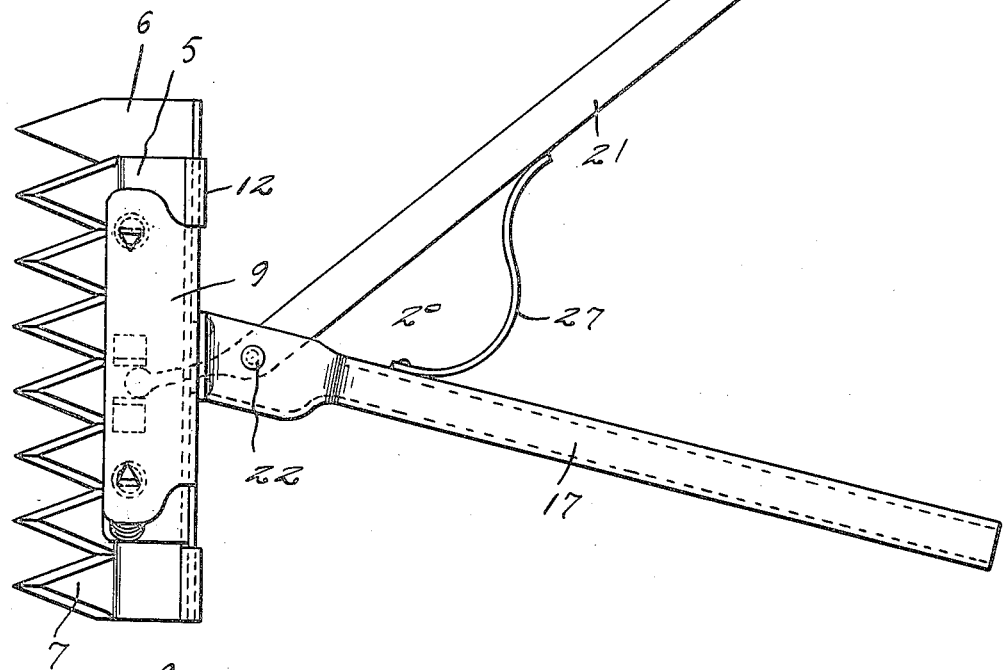
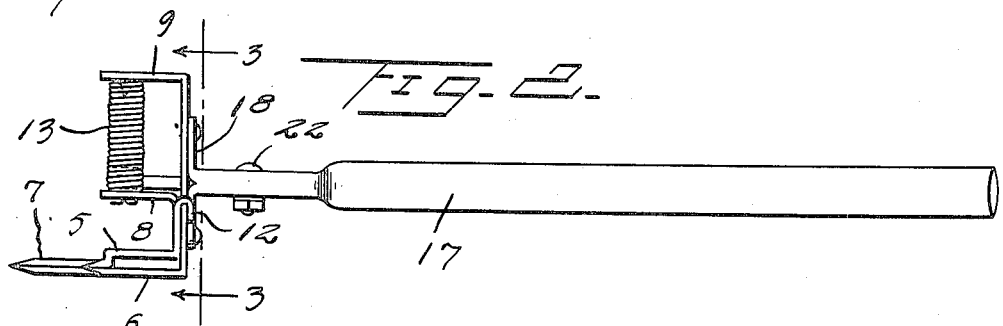
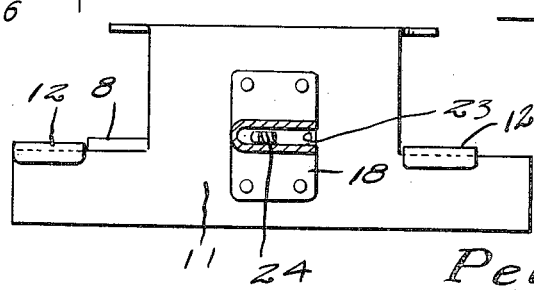
Inventor
Peter Shearer
By Randolph & Beavers
Attorneys March 14, 1950     P. SHEARER     2,500,434
LAWN TRIMMER
Filed Jan. 19, 1945     2 Sheets-Sheet 2
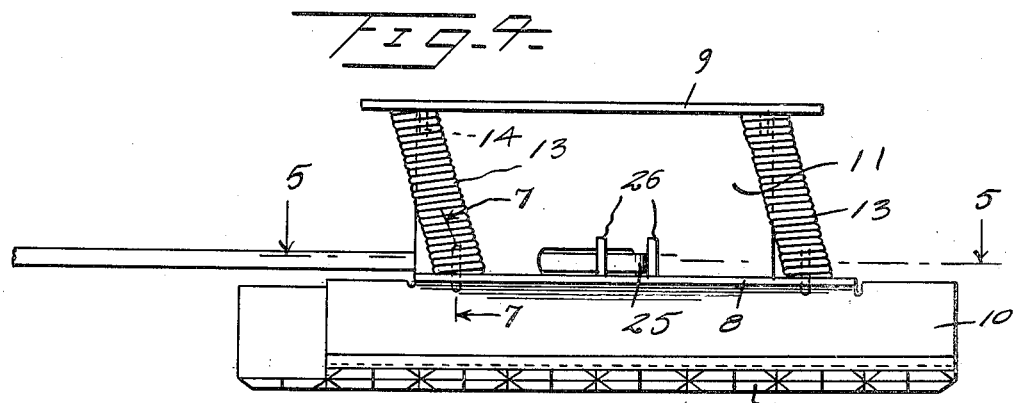
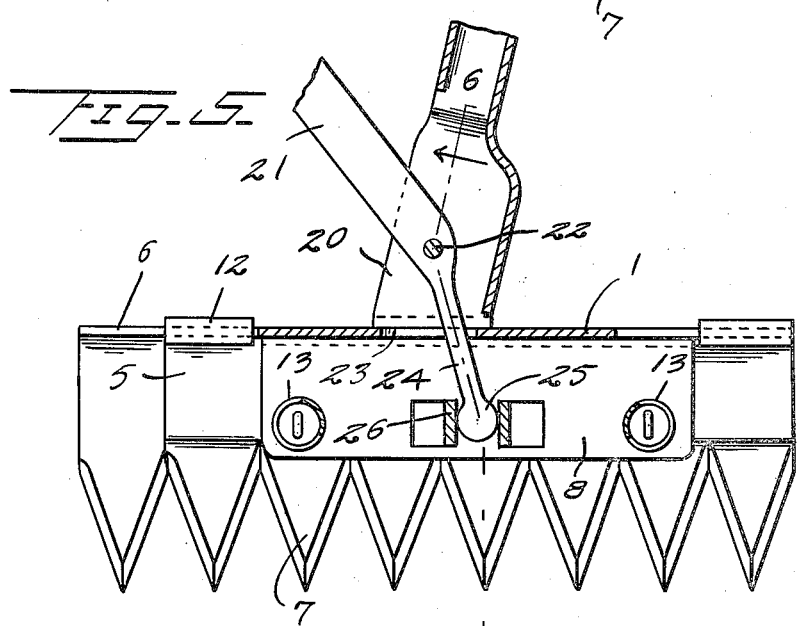
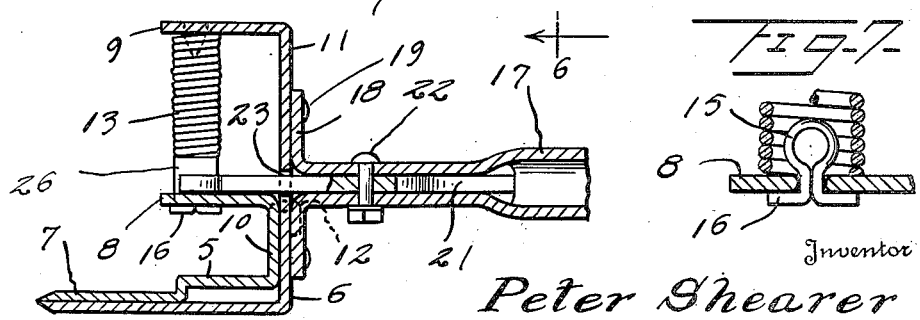
Inventor
Peter Shearer
By Randolph & Beavers
Attorneys Patented Mar. 14, 1950

2,500,434

UNITED STATES PATENT OFFICE 2,500,434

LAWN TRIMMER

Peter Shearer, Phoenix, Ariz.

Application January 19, 1945, Serial No. 573,490

3 Claims. (Cl. 30—213)

The present invention relates to new and useful improvements in lawn trimmers of a type embodying hand operated reciprocating cutters and the invention has for its primary object to provide spring means for yieldably maintaining cutters in cooperating engagement.

A further object of the invention is to provide novel means for operatively connecting pivoted handle members to the respective cutter bars.

A still further object is to provide a device of this character of simple and practical construction, which is efficient and reliable in operation, relatively inexpensive to manufacture and otherwise well adapted for the purposes for which the same is intended.

Other objects and advantages reside in the details of construction and operation as more fully thereinafter described and claimed, reference being had to the accompanying drawings forming part hereof, and in which:

Figure 1 is a top plan view,

Figure 2 is a side elevational view,

Figure 3 is a vertical sectional view taken substantially on a line 3—3 of Figure 2, Figure 4 is a front elevational view, Figure 5 is a horizontal sectional view taken substantially on a line 5—5 of Figure 4, Figure 6 is a sectional view taken substantially on a line 6—6 of Figure 5, Figure 7 is a fragmentary sectional view through the lower end of one of the springs and taken substantially on a line 7—7 of Figure 4.

Referring now to the drawings in detail wherein for the purpose of illustration I disclose a preferred embodiment of invention, the numerals 5 and 6 designates upper and lower cutter bars respectively, having the corresponding tapered coacting cutter teeth 7 projecting forwardly therefrom.

The cutter bars 5 and 6 are each of substantially U-shaped construction in cross section, the cutter bar 5 including a forwardly projecting upper flange 8 and the cutter bar 6 including a forwardly projecting upper flange 9 spaced above and overlying the flange 8 as will be apparent from an inspection of Figure 6 of the drawings. The flange 8 is connected to the cutter bar 5 by means of a rear wall 10 while the flange 9 is connected to the cutter bar 6 by means of a rear wall 11.

The lower cutter bar 6 is of a length greater than the upper cutter bar 5 and the end portions of the cutter bars projects outwardly beyond their respective flanges, the upper edge of the wall 10 of cutter bar 5 being bent downwardly as indicated at 12 to provide guides slidably receiving the upper edges of the wall 11 of the cutter bar 6.

A pair of expansible coil springs 13 are placed under tension between the flanges 8 and 9 adjacent the ends thereof, the upper ends of the springs being engaged with lugs 14 struck downwardly from the flange 9 and upstanding members 15 are inserted through the flange 8 into the lower ends of the springs 13 to anchor said lower ends of the springs, said members 15 preferably being in the form of cotter keys having their end portions 16 bent under the flange 8 as shown more clearly in Figure 7 of the drawings. The springs 13 thus yieldably urge the teeth 7 of the cutter bars 5 and 6 into frictional engagement with each other during reciprocation of the blades.

A tubular handle 17 is formed with a flange 18 at one end for attaching to the rear wall 11 of the cutter bar 6 by means of rivets or the like 19, one side of the handle adjacent the flange being formed with a longitudinally extending slot or opening 20 for receiving the inner end of a handle 21 pivoted to the handle 17 by means of a pin 22.

The rear wall 11 of the cutter bar 6 is formed with a horizontally extending slot 23 at a point immediately above the flange 8 of the cutter bar 5 and through which an extension 24 on the inner end of the handle 21 projects into a position overlying the flange 8, the end of the extension 24 being formed with a rounded head 25 positioned in close fitting engagement between a pair of lugs 26 struck upwardly from the flange 8.

A leaf spring 27 has one end secured to the side of the handle 17 by means of a screw or the like 28 while the other end of the spring 27 bears against the adjacent edge of the handle 21 to yieldably urge the handles away from each other. The rear portions of the cutter bars 5 and 6 are spaced one above the other to permit escape of grass cuttings from between the blades.

In the operation of the device the handle 17 is preferably held stationary while the handle 21 is moved toward the handle 17 whereby the extension 24 on the handle 21 will reciprocably actuate the upper cutter bar 5 to effect a cutting of grass entering the spaces between the teeth 7, the spring 27 acting on the handle 21 to move the latter in an opposite direction.

It is believed the details of construction, opera-

Having thus described the invention what I claim is:

1. A cutter of the class described comprising a pair of U-shaped cutter bars each having teeth projecting from one edge thereof and arranged in superposed co-acting cutting relation, the other edges of said cutter bars being disposed in vertically spaced relation to each other, spring means interposed between said last named edges of the cutter bars to yieldably urge the cutting edges thereof into cutting relation and means for reciprocably actuating one of the cutter bars relative to the other cutter bar.

2. A cutter of the class described comprising a pair of cutter bars of U-shaped cross section having superposed coacting teeth projecting from one edge of each bar, vertically spaced horizontal flanges on the other edges of said cutter bars, coil springs compressed between said flanges to yieldably urge the teeth into cutting engagement, a pair of pivotally connected handles, one of said handles being fixed to one of the cutter bars, and means operatively connecting the other of said handles to the other of said cutter bars for reciprocably actuating the latter.

3. A cutter of the class described comprising a pair of cutter bars of U-shaped cross section including an upper cutter bar and a lower cutter bar having forwardly projecting teeth in superposed cutting engagement, and said cutter bars further including upstanding rear walls and forwardly projecting flanges spaced vertically from each other, said rear walls having reduced end portions, downturned guides on the rear wall of the upper cutter bar slidably receiving the upper edge of the rear wall of the lower cutter bar, spaced apart lugs on the flange of the upper cutter bar, a handle having one end fixed to the lower cutter bar, a second handle pivoted to the first named handle and having its inner end engaged between said lugs to reciprocably actuate the upper cutter bar, and coil springs compressed between the flanges of the upper and lower cutter bars to yieldably maintain the teeth in cutting engagement.

PETER SHEARER.

REFERENCES CITED

The following references are of record in the file of this patent:

UNITED STATES PATENTS

| Number | Name | Date |
| --- | --- | --- |
| 94,803 | Wilson | Sept. 14, 1869 |
| 1,584,459 | Link | May 11, 1926 |
| 1,861,617 | Wahl | June 7, 1932 |